(No Model.)

J. E. HOYT.
FOOD STEAMER.

No. 243,906. Patented July 5, 1881.

Attest:
R. F. Barnes
S. W. Luce

Inventor:
Jennie E. Hoyt,
by Ellis Spear
Atty.

UNITED STATES PATENT OFFICE.

JENNIE E. HOYT, OF MILFORD, WISCONSIN.

FOOD-STEAMER.

SPECIFICATION forming part of Letters Patent No. 243,906, dated July 5, 1881.

Application filed March 17, 1881. (No model.)

*To all whom it may concern:*

Be it known that I, JENNIE E. HOYT, of Milford, in the county of Jefferson and State of Wisconsin, have invented a new and useful Improvement in Food-Steamers; and I do hereby declare that the following is a full, clear, and exact description of the same.

My invention relates to food-steamers; and it consists of certain details of construction hereinafter set forth, and specifically claimed.

Figure 1:
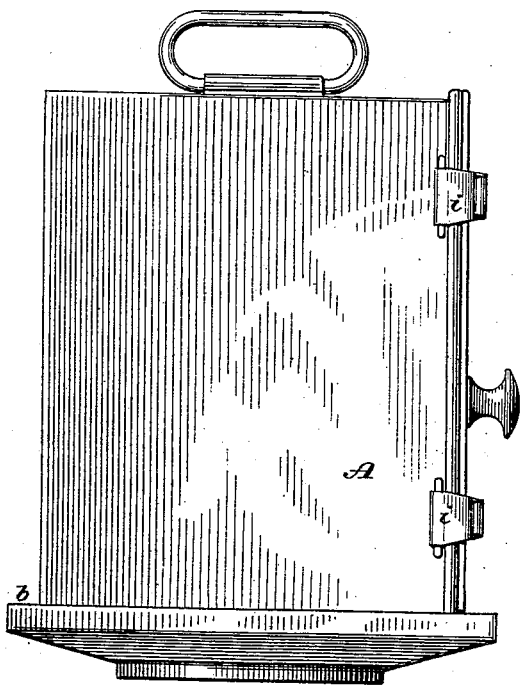
Figure 2:
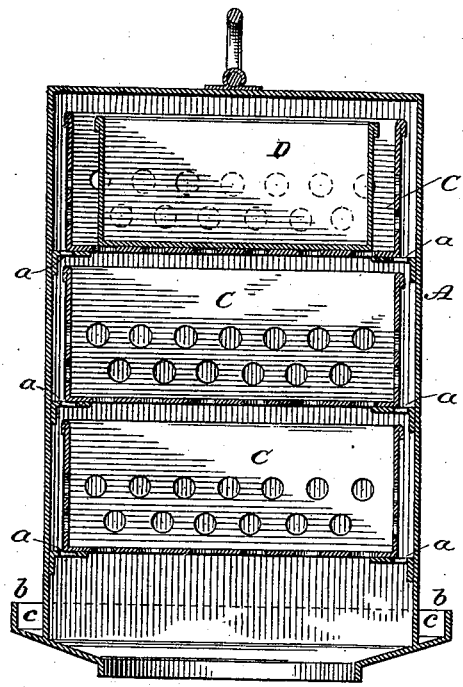
Figure 3:
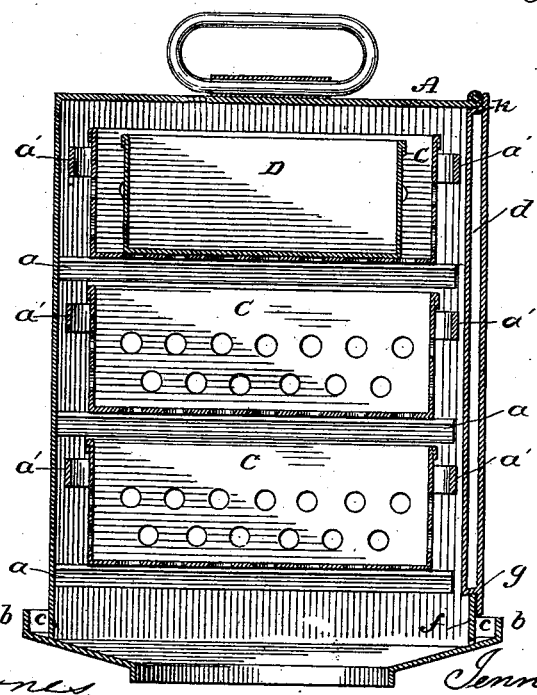

In the accompanying drawings, Figure 1 represents a side elevation; Fig. 2, a section across the pans; and Fig. 3, a like section taken longitudinally, both figures representing the pans in place in the steamer.

Heretofore, as is well known, steamers of various forms have been used for steaming various articles of food, in some of which the steam is generated in the steamer itself, and in others the steam is generated in a boiler and passed into the receptacle which contains the food to be cooked. My invention belongs to the latter class.

In the drawings, A represents a box or case, preferably rectangular, and made of tin or other suitable sheet metal. It may be made of different sizes, corresponding to the amount of food which it may be required to contain. Upon the inside I place horizontal flanges $a\ a$, made preferably of sheet metal, arranged in pairs, those of each pair being exactly opposite each other, and adapted to receive and support perforated pans C. In the drawings I have shown three sets of these flanges or supports adapted to hold three of the perforated pans; but a greater or less number may be used, if desired. These flanges are perforated throughout their entire length, in order to permit the steam to rise freely around the pans and between them and the walls of the chamber or box. The pans are made smaller than the box, so as to leave a space on all sides for the passage of the steam. They are perforated in the bottom and sides, so that the steam can pass freely through them and into the vegetables or other articles of food which they may contain, or, in case a closed dish be placed in one of the pans, that the steam may pass freely about it, in order to heat it and cook its contents. The handles $a'\ a'$ keep the pans from coming in contact with the wall in the rear or with the door in front, and when put in place they may be set exactly in the middle, so that free circulation is provided on all sides. I also provide a smaller closed pan or dish, D, fitted to be placed within the pans, and made approximately steam-tight, to hold any kind of food which is to be cooked without direct contact with the steam. This pan or dish D is fitted in size so that when placed within the pan there will be a steam-space between its sides and the sides of the outer pan.

The bottom of the case or box is formed with a round opening, through which the steam is admitted from the kettle upon which the case is set. This bottom is made larger than the case, so that it may be set upon different sizes of kettle, and it is also made of a dish shape, or lower about the opening, so that the water of condensation may run freely back into the kettle. I also form a flange, $b$, about the edge of the bottom, on the outside, which leaves a channel, $c$, adapted to catch any water formed by the condensed steam escaping about the door.

I make the door preferably of two thicknesses of sheet metal, the inner part, $d$, being adapted to fit snugly within the jambs of the door, which makes an approximately-close joint. In order, however, to secure more effectually the return of any water formed by condensed steam escaping about the door, I provide a flange, $f$, at the bottom of the doorway, slightly raised above the outer flange, so that the inner portion of the door shuts snugly over it. This inner portion of the door, which thus shuts closely over the flange $f$, is formed with a groove, $g$. The connection $h$ at the top, between the front and back walls of the door, is also inclined inward, so that water which condenses upon the inner surface of the door will tend to run down upon the sharp edge formed by the groove $g$ and drop within the flange $f$. The water of condensation is thus prevented from falling outside, and is returned to the kettle, thus economizing heat, and at the same time preventing the water from running down upon the stove or range. Suitable catches, $i\ i$, are provided for holding the door in a closed position.

Having thus described my invention, what I claim is—

1. Combined in a food-steamer, the box A, having open bottom, a series of perforated supporting-flanges, $a$, the receptacles C, perforated at bottom and sides, and so arranged on the supports $a$ as to leave a space, to which steam is admitted through said perforated supports, and the surrounding drip-trough $c$.

2. Combined with a vessel for steaming food, the double-walled door having the inclined top $k$, and the inclined bottom forming groove $g$, and the flange $f$.

In testimony whereof I have signed my name to this specification in the presence of two subscribing witnesses.

JENNIE ESSELSTYN HOYT.

Witnesses:
CYNTHA B. WOOD,
M. CUNNINGHAM.